(12) United States Patent
Li et al.

(10) Patent No.: US 12,088,082 B2
(45) Date of Patent: Sep. 10, 2024

(54) INTEGRATED CIRCUIT-BASED NANO-RELAY

(71) Applicant: DIGITAL GRID RES. INST., CHINA SOUTHERN PWR. GRID, Guangzhou (CN)

(72) Inventors: Peng Li, Guangzhou (CN); Xiangjun Zeng, Guangzhou (CN); Wei Xi, Guangzhou (CN); Xiaobo Li, Guangzhou (CN); Hao Yao, Guangzhou (CN); Yang Yu, Guangzhou (CN); Tiantian Cai, Guangzhou (CN)

(73) Assignee: Digital Grid Research Institute, China Southern Power Grid, Guangzhou (CN)

( * ) Notice: Subject to any disclaimer, the term of this patent is extended or adjusted under 35 U.S.C. 154(b) by 0 days.

(21) Appl. No.: 18/282,172

(22) PCT Filed: Mar. 11, 2022

(86) PCT No.: PCT/CN2022/080260
§ 371 (c)(1),
(2) Date: Sep. 14, 2023

(87) PCT Pub. No.: WO2022/262331
PCT Pub. Date: Dec. 22, 2022

(65) Prior Publication Data
US 2024/0178648 A1    May 30, 2024

(30) Foreign Application Priority Data
Jun. 18, 2021  (CN) .......................... 202110682417.0

(51) Int. Cl.
*H02H 3/08*       (2006.01)
*H02H 3/30*       (2006.01)

(52) U.S. Cl.
CPC .............. *H02H 3/08* (2013.01); *H02H 3/305* (2013.01)

(58) Field of Classification Search
CPC ................................ H02H 3/08; H02H 3/305
(Continued)

(56) References Cited

U.S. PATENT DOCUMENTS

| 2012/0325630 | A1 | 12/2012 | Pulskamp et al. |
| 2013/0054043 | A1* | 2/2013 | Klodowski ......... G01R 31/343 |
| | | | 713/320 |

(Continued)

FOREIGN PATENT DOCUMENTS

| CN | 103066561 A | 4/2013 |
| CN | 105071345 A | 11/2015 |

(Continued)

OTHER PUBLICATIONS

International Search Report for corresponding Application No. PCT/CN2022/080260 dated May 19, 2022, 5 pages.

(Continued)

*Primary Examiner* — Md Azad
(74) *Attorney, Agent, or Firm* — Taft Stettinius & Hollister LLP

(57) ABSTRACT

An integrated circuit-based nano-relay, comprising: an integrated circuit system of the nano-relay constructed according to an integrated circuit module built from a combinational logic circuit. An integrated power data processing algorithm is called by means of the integrated circuit module to perform signal processing on an input power signal, and power service data is output, that is, an integrated circuit is mainly constructed by means of the combinational logic circuit, the protection logic of the nano-relay is achieved by means of a hardware circuit module, and a response speed of the relay is improved.

10 Claims, 9 Drawing Sheets

(58) Field of Classification Search
USPC .......................................................... 700/293
See application file for complete search history.

(56) References Cited

U.S. PATENT DOCUMENTS

| | | | |
|---|---|---|---|
| 2017/0250043 A1 | 8/2017 | Hurwitz et al. | |
| 2023/0253777 A1* | 8/2023 | Jackson | H02H 3/0935 361/93.1 |
| 2024/0063962 A1* | 2/2024 | Lin | H04L 5/0094 |
| 2024/0097774 A1* | 3/2024 | Lin | H04B 7/0888 |
| 2024/0103498 A1* | 3/2024 | Stephens | G05B 19/4185 |

FOREIGN PATENT DOCUMENTS

| CN | 105720684 A | 6/2016 |
|---|---|---|
| CN | 107850642 A | 3/2018 |
| CN | 111427840 A | 7/2020 |
| CN | 211879309 A | 11/2020 |
| CN | 112260239 A | 1/2021 |
| CN | 113258926 A | 8/2021 |

OTHER PUBLICATIONS

Chinese Office Action for corresponding Application No. 202110682417.0 dated Aug. 23, 2021, 10 pages.
Chinese Office Action for corresponding Application No. 202110682417.0 dated Sep. 10, 2021, 3 pages.
International Search Authority for corresponding Application No. PCT/CN2022/080260 dated May 19, 2022, 1 page.
Written Opinion for corresponding Application No. PCT/CN2022/080260 dated May 19, 2022, 5 pages.
Li, Zhihong, "Frontiers in Micro-Nano Electro-Mechanical Systems (MEMS/NEMS)," dated Dec. 31, 2012, pp. 1599-1615.
Xi, Wei, et al., "Research on Chip-Based Protection and Measuring and Control Devices," dated Nov. 30, 2016, pp. 91-97.

* cited by examiner

INTEGRATED CIRCUIT-BASED NANO-RELAY

CROSS REFERENCE TO RELATED APPLICATIONS

This is a U.S. National Stage application of, and claims priority to, PCT/CN2022/080260, filed Mar. 11, 2022, which further claims priority to Chinese Patent Application No. 202110682417.0, filed Jun. 18, 2021, the disclosures of which are incorporated herein by reference in their entirety.

TECHNICAL FIELD

The present application relates to the technical field of electrical equipment, and more particularly, relates to an integrated circuit-based nano relay.

BACKGROUND

Relay protection is an indispensable portion in a power system, and it is the most essential, most important and most effective technical solution to ensure power terminal safety, prevent or limit blackout of power systems in a large area. All primary equipment in the power system must be equipped with relay protection devices, and power related regulation specifies that any electrical equipment (lines, buses, generators, transformers and the likes) are not allowed to operate without relay protection. It may be noted that although relay protection device is not primary equipment in the power system, ensuring safe operations of the primary equipment plays an indispensable role. Through domestic and international proofs from experiences, as soon as relay protection device incorrectly operates, accidents generally are exacerbated which breeds serious consequences.

Relay protection device is built using multiple independent motor-type relays and physical analog circuits at an early age, there are limitations in the areas of efficiency, performance and efficacy including slow relay operations, large volumes, high power consumption, monotonous functions and complex maintenance. With the development of computer science technology, especially in applications of micro-computers and microprocessors, research on computerized relay protection has obtained prominent fruition. Micro-controller relay protection uses computer software algorithms to analyze a fault determination electrical quantity of a power system, and compare the result to determine whether to send a tripping signal. Nevertheless, with a large number of distributed power sources, direct-current transmission and electric cars being openly accessed into the power system, a novel deep carbon power system which is led by power and electrical components has gradually been formed. Fundamental elements of existing micro-controller relay protection device depends on software program logic, protection response time may only reach a millisecond class which may not satisfy rapidity requirement of millisecond class protection control of the novel power system under permeability of future advanced power and electrics.

SUMMARY

Accordingly, in view of the above-mentioned technical problem, a nano relay based on integrated circuits that can improve a response speed of the relay is provided.

A nano relay based on integrated circuit, built with an integrated circuit module; wherein the integrated circuit module includes a combinational logic circuit module, the combinational logic circuit module includes circuit submodules with different hardware algorithm logics, and the combinational logic circuit is used to perform signal processing on an input power signal by invoking a power data processing algorithm, and to output power service data, the power data processing algorithm being integrated in the circuit submodules of the combinational logic circuit; wherein the combinational logic circuit module comprises at least one circuit submodule of: a characteristic extraction circuit submodule, a numerical value comparison circuit submodule, a logic determination circuit submodule, a signal conditioning circuit submodule, a band-limiting filtering circuit submodule, a sampling maintaining circuit submodule, an analog-to-digital conversion circuit submodule, a message decoding circuit submodule, a low-pass filtering circuit submodule, or an interpolation circuit submodule.

In accordance with one of the embodiments, the integrated circuit module further includes a peripheral signal processing circuit module, configured to: perform data processing on a power service data output by the combinational logic circuit, and protect and control a power system.

In accordance with one of the embodiments, the power signal is a digital signal, the combinational logic circuit module is configured to perform logic determination processing on the digital logic through invoking the power data processing algorithm, and to output a switching quantity signal; the combinational logic circuit module comprises the characteristic extraction circuit submodule, the numerical value comparison circuit submodule and the logic determination circuit submodule; where, the characteristic extraction circuit submodule is configured to: invoke the power data processing algorithm to extract a signal parameter from the digital signal, perform calculation on the signal parameter, and obtain a characteristic quantity; the numerical value comparison circuit submodule is configured to: compare the characteristic quantity with a preset setting parameter sent by a CPU, and obtain a comparison result; and the logic determination circuit submodule is configured to: perform a numerical value comparison result driven output of the comparison result according to a protection service logic, and output a corresponding switching quantity signal.

In accordance with one of the embodiments, the power data processing algorithm includes at least one of a half-cycle Fourier fundamental operation, a full-cycle Fourier fundamental operation, a least squares filtering algorithm, a Kalman filtering algorithm, or a DC component calculation algorithm; wherein the characteristic quantity comprises at least one of: a fundamental wave component, a DC component, or respective integer harmonic wave components.

In accordance with one of the embodiments, the nano relay is an integrated circuit-based relay with an over-current protection logic, and the digital signal is a discrete sampling value of current of each phase.

where the characteristic extraction circuit submodule is configured to: invoke the power data processing algorithm to extract a signal parameter of the discrete sampling value of current of each phase for calculation, and obtain a characteristic quantity; the characteristic quantity is a module value of current of each phase;

the numerical value comparison circuit submodule is configured to: compare the characteristic quantity with a preset setting current parameter sent by the CPU, and obtain a comparison result;

the logic determination circuit submodule is configured to: perform a numerical value comparison result driven output of the comparison result based on the protection service logic, and output an over-current protection switching quantity signal.

In accordance with one of the embodiments, the nano relay is an integrated circuit-based relay with a differential protection logic, the digital signal is a discrete sampling value of an inflow current and an outflow current of a differential protection logic relay protection device in a normal condition;

where the characteristic extraction circuit submodule is configured to invoke the power data processing algorithm to extract vectors of the inflow current and the outflow current, perform calculation on the vectors, and obtain a differential current value;

the numerical value circuit submodule is configured to: compare the differential current value with the preset setting parameter sent by the CPU, and obtain a comparison result;

the logic determination circuit submodule is configured to: perform a numerical value comparison result driven output of the comparison result, and output a differential protection switching quantity signal.

In accordance with one of the embodiments, the power signal is an analog signal, and the combinational logic circuit module is configured to perform logic determination processing on the analog signal by invoking the power data service algorithm, and to output a switching quantity signal;

where the combinational logic circuit module comprises the signal conditioning circuit submodule, the band-limiting filtering circuit submodule, the sampling maintaining circuit submodule, the analog-to-digital conversion circuit submodule, the characteristic extraction circuit submodule, the numerical value comparison circuit submodule, and the logic determination circuit submodule, where the signal conditioning circuit submodule is configured to amplify the analog signal, to protect a circuit of a front section, and to obtain an amplified signal;

the band-limiting filtering circuit submodule is configured to perform filtering on the amplified signal, and to obtain a denoised analog signal;

the sampling maintaining circuit submodule is configured to ensure a conversion accuracy of a digital signal obtained from converting the denoised analog signal by the analog-to-digital conversion circuit submodule;

the characteristic extraction circuit submodule is configured to invoke the power data processing algorithm to extract a signal parameter from the digital signal obtained from converting the denoised analog signal by the analog-to-digital conversion circuit submodule, to perform calculation on the signal parameter, and to obtain a characteristic quantity;

the numerical value comparison circuit submodule is configured to compare the characteristic quantity with a preset setting parameter sent by a CPU, and to obtain a comparison result; and the logic determination circuit submodule is configured to perform a numerical value comparison result driven output of the comparison result according to a protection service logic, and to output a corresponding switching quantity signal.

In accordance with one of the embodiments, the inputted power signal is power message data, the peripheral signal processing circuit module is further configured to perform a storm suppression and a message dispersion on the power message data to obtain original power message data to be processed.

In accordance with one of the embodiments, the combinational logic circuit module is configured to invoke the power data processing algorithm to perform a sampling differential processing on the original power message data and output sampling value message data.

In accordance with one of the embodiments, the combinational logic circuit module comprises the message decoding circuit submodule, the low-pass filtering circuit module and the interpolation circuit submodule;

the message decoding circuit submodule is configured to recognize, remove duplications from, and parse suppressed and dispersed power message data to obtain target power message data;

the low-pass filtering circuit submodule is configured to perform low-pass filtering on the target message power data to obtain denoised target power message data; and the interpolation circuit submodule is configured to invoke a sampling value algorithm to perform interpolation and synchronization on the target power message data to obtain sampling value message data of target sampling points.

For the above-mentioned nano relay based on integrated circuits, which is built according to at least one circuit submodule including a characteristic extraction circuit submodule, a numerical comparison circuit submodule, a logic determination circuit submodule, a signal conditioning logic submodule, a low-pass filtering circuit submodule, a sampling maintaining circuit submodule, an analog-to-digital conversion circuit submodule, a message decoding circuit submodule, a low-pass filter circuit submodule and an interpolation circuit submodule of combinational logic circuit. A signal processing is performed on inputted power signal by invoking respective power data processing algorithm. A power service data is outputted, that is, integrated circuits are mainly built through combinational logic circuit. A protection logic of nano relay is realized using hardware circuit module, thereby improving a response rate of relay.

DETAILED DESCRIPTION OF THE EMBODIMENTS

In order to make the objectives, technical solutions and advantages of the present disclosure clearer, the present disclosure is described in further detail below with reference to the accompanying drawings and embodiments. It should be understood that particular embodiments described herein are intended only to interpret the present disclosure and not intended to limit the present disclosure.

Figure 1:
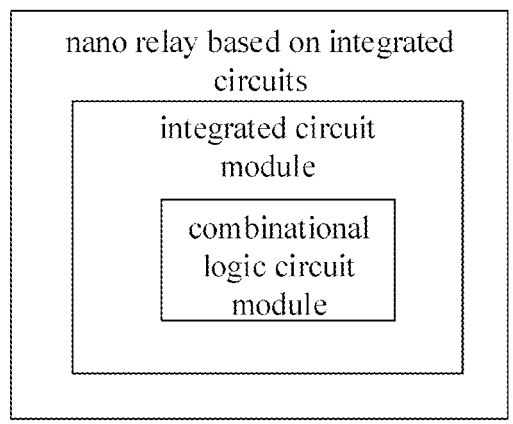
FIG. 1 is a structural block schematic diagram of a nano relay based on integrated circuits according to one embodiment.

According to an embodiment, as shown in FIG. 1, an integrated circuit-based nano relay is provided. According to the present embodiment, the nano relay includes and is built with an integrated circuit module. The integrated circuit module includes a combinational logic circuit module. The combinational logic circuit module includes circuit submodules with different integrated hardware algorithm logics, and the combinational logic circuit is used to perform signal processing on an input power signal by invoking a power data processing algorithm, and to output power service data. The power data processing algorithm is integrated in the circuit submodules of the combinational logic circuit.

The power signal may be an analog signal or a digital signal, and the digital signal may be power message data. When the power signal is power message data, the power signal is obtained through a time control circuit module in the integrated circuit module, where the time control circuit module includes a combinational logic circuit consisting of two time alignment registers and one nanosecond counter. A counting period of the nanosecond counter is 1 second, and the nanosecond counter is used to implement an external IRIG-B code time alignment function (The IRIG-B code time alignment function refers to aligning the power message data to obtain a power signal with the same sampling time.) The nano relay supports an input of B code with positive phase and B code with negative phase, that is, it resolves an input of an external IRIG-B code, tracks a frequency and stores IRIG-B aligned time into the time alignment registers when an external time alignment signal is normal. IRIG-B time alignment information is updated once per second (at an exact moment of a second), and a second pulse signal with a pulse width of 125 ms is generated, where a falling edge of the second pulse signal corresponds to the exact moment of a second. When the external time alignment signal is abnormal, the nano relay maintains a time preservation state based on a previously learned sample, clears the time alignment registers, and periodically generates second pulse signals with the pulse width of 125 ms, where the falling edge of the second pulse signal corresponds to the exact moment of a second. When a CPU detects the falling edge of the second pulse signal, it reads information from the time alignment registers.

The combinational logic circuit is constructed based on a protection algorithm logic of a power system relay protection service. Different types of combinational logic circuits may be constructed based on different protection algorithm logics, and nano relays with different types of functions may be obtained. The combinational logic circuit module includes circuit submodules with different hardware algorithm logics (that is, circuit submodules). The combinational logic circuit module includes at least one circuit submodule of following: a characteristic extraction circuit submodule, a numerical value comparison circuit submodule, a logic determination circuit submodule, a signal conditioning circuit submodule, a band-limiting filtering circuit submodule, a sampling maintaining circuit submodule, an analog-to-digital conversion circuit submodule, a message decoding circuit submodule, a low-pass filtering circuit submodule, or an interpolation circuit submodule. Nano relays with different functions may be obtained through integrating different circuit submodules. The power system relay protection service includes transmission line protection, transformer protection, generator protection, busbar protection, and other service scenarios. The power data processing algorithm includes at least one of a half-cycle Fourier operation on a fundamental wave, a full-cycle Fourier operation on a fundamental wave, a least squares filtering algorithm, a Kalman filtering algorithm, or a DC component calculation algorithm.

The nano relay includes a logic determination type nano relay, a sampling value processing type nano relay, an electrical parameter calculation type nano relay, a time management type nano relay, a communication management type nano relay, and the like. For nano relays with different functions, the circuit submodules in the combinational logic circuit thereof are also different. An output of the logic determination nano relay has only two states, which is a "yes" or a "no". The critical point between "yes" and "no" is expressed by a "criterion" of an "inequality". The "criterion" of the "inequality" is implemented in a circuit through a design of a combinational logic circuit that is composed of numerical value comparison, a trigger, and a logic gate circuit. For example, the combinational logic circuit module is constructed based on respective protection algorithm logics of "current differential protection", "directional current protection", "zero-sequence current protection", "distance protection", "pilot protection", "high-frequency protection", "optical fiber differential protection", "negative sequence current protection" in the power system relay protection service.

For example, the sampling value processing type nano relay is used to sample and interpolate an acquired analog signal to obtain a sampling value message. Sampling point data with a same sampling time is calculated based on the sampling value message and the sampling point data is sent to other nodes. That is, the combinational logic circuit module of the sampling vale processing type nano relay possesses a nano-level hardware circuit module (circuit submodule) with an integrated sampling value synchronization algorithm.

The electrical parameter calculation type nano relay is used to extract a fundamental wave component, a DC component, and respective integer harmonic wave components of a collected input periodic electrical signal. The constructed combinational logic circuit is a hardware circuit module that implements a specific algorithm. A hardware algorithm includes a half-cycle Fourier operation on a fundamental wave, a full-cycle Fourier operation on a fundamental wave, a least squares filtering algorithm, a Kalman filtering algorithm, a DC component calculation algorithm, and the like.

For example, the full-cycle Fourier operation on a fundamental wave is used to process an electrical signal. The electrical signal in the power system is mainly composed of a fundamental wave and an odd-order harmonic wave. Assuming a periodic time function to be analyzed is u(t), according to the half-cycle Fourier algorithm, a real part URn of an n-th multiple frequency component and an imaginary part UIn of the n-th multiple frequency component are respectively expressed as follows.

$$\begin{cases} U_{Rn} = \frac{4}{N}\sum_{k=1}^{N/2} u_k \cos\left(nk\frac{2\pi}{N}\right) \\ U_{In} = \frac{4}{N}\sum_{k=1}^{N/2} u_k \sin\left(nk\frac{2\pi}{N}\right) \end{cases}$$

In the above formulas, N is a number of sampling points in one period, $u_k$ is a k-th sampling value.

Assume that an instantaneous value of a line zero-sequence current is i0, and an instantaneous value of a power grid zero-sequence voltage is u0. By sampling 12 points per cycle, a fundamental wave component may be obtained. According to the half-cycle Fourier algorithm, a real part U0R of the voltage, a real part I0R of the current, an imaginary part U0I of the voltage an imaginary part I0I of the current may be respectively obtained as follows.

$$\begin{cases} U_{0R} = \frac{1}{6}\left[(u_{02} - u_{04}) + \sqrt{3}(u_{01} - u_{05}) - 2u_{06}\right] \\ U_{01} = \frac{1}{6}\left[(u_{01} - u_{05}) + \sqrt{3}(u_{02} - u_{04}) + 2u_{03}\right] \end{cases}$$

$$\begin{cases} I_{0R} = \frac{1}{6}\left[(i_{02} - i_{04}) + \sqrt{3}(i_{01} - i_{05}) - 2i_{05}\right] \\ I_{01} = \frac{1}{6}\left[(i_{01} - i_{05}) + \sqrt{3}(i_{02} - i_{04}) - 2i_{03}\right] \end{cases}$$

Through derivation, allow the following equation to be established:

$$P_{op} = (I_{0R}U_{0R} + I_{0I}U_{0I})$$

Therefore, the operation condition for implementing a selective fault protection may be set as $P_{op} > K$ K is a setting threshold. For a faulted branch, there always exists a relationship of $P_{op} > 0$, and for a non-faulted branch, there always exists a relationship of $P_{op} = 0$ (when considering an effect of line insulation resistance, there exists a relationship of $P_{op} \le 0$ for the non-faulted branch, and Pop of the faulted branch is enhanced). After filtering out a reactive component of the zero-sequence current, the faulted line may be accurately and reliably identified using an active current. Since the protection principle is independent of the reactive component of the power grid zero-sequence current, it is not necessary to know the length of the power grid outgoing line or the magnitude of the grounding current, which is conducive to capturing instantaneous ground faults and improving sensitivity and speed of a chip-based protection device.

For the above-mentioned integrated circuit-based nano relay, the nano relay is constructed based on the integrated circuit module built with the combinational logic circuit, signal processing is performed on an input power signal using various power data processing algorithms invoked by the combinational logic circuit module, and power service data is output. That is, an integrated circuit is constructed mainly through the combinational logic circuit, and a protection logic of the nano relay is implemented by a hardware circuit module, thereby improving the response speed of the relay.

Figure 2:
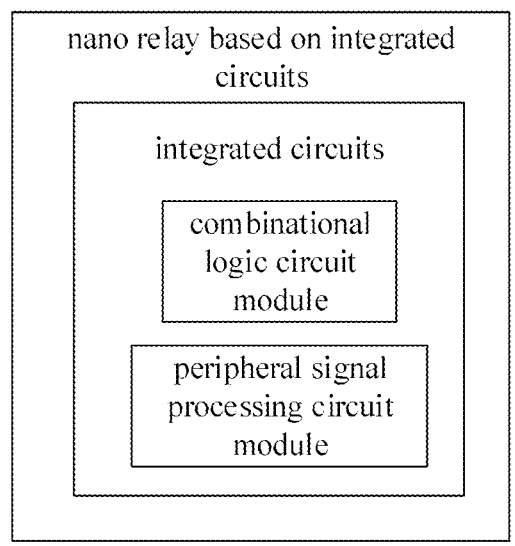
FIG. 2 is a structural block schematic diagram of a nano relay based on integrated circuits according to another embodiment.

According to another embodiment, as shown in FIG. 2, an integrated circuit-based nano relay is provided. In the present disclosure, an integrated circuit module includes and is built by a combinational logic circuit module and a peripheral signal processing circuit module, and the nano relay includes the integrated circuit module. When an input power signal is an analog signal, through invoking different circuit submodules of an integrated hardware algorithm in the combinational logic circuit module, a logic determination processing is performed on the analog signal using a power data processing algorithm, and a switching signal is output. The peripheral signal processing circuit module is configured to perform data processing on power service data output by the combinational logic circuit, to protect and to control a power system. Circuit submodules in the combinational logic circuit module include a signal conditioning circuit submodule, a band-limiting filtering circuit submodule, a sampling maintaining circuit submodule, an analog-to-digital conversion circuit submodule, a characteristic extraction circuit submodule, a numerical value comparison circuit submodule, and a logic determination circuit submodule.

The signal conditioning circuit submodule is configured to amplify an analog signal, to protect a circuit of a front section, and to obtain an amplified signal. The band-limiting filtering circuit submodule is configured to perform filtering on the amplified signal, and to obtain an analog signal after noise reduction. The sampling maintaining circuit submodule is configured to ensure a conversion accuracy of a digital signal obtained from converting the analog signal after noise reduction by the analog-to-digital conversion circuit submodule. The characteristic extraction circuit submodule is configured to invoke a power data processing algorithm to extract a signal parameter from the digital signal obtained from converting the analog signal after noise reduction by the analog-to-digital conversion circuit submodule, to perform calculation on the signal parameter, and to obtain a characteristic quantity. The characteristic quantity includes at least one of a fundamental wave component, a DC component, or respective integer harmonic wave components. The numerical value comparison circuit submodule is configured to compare the characteristic quantity with a preset tuning parameter sent by the CPU, and to obtain a comparison result. The logic determination circuit submodule is configured to perform a numerical value comparison result driven output of the comparison result according to a protection service logic, and to output a corresponding switching quantity signal.

The above-mentioned nano relay based on integrated circuit, via an integrated circuit module which is built by a peripheral signal processing circuit and a combinational logic circuit, converts an analog signal, such as an externally input voltage and current, into a digital signal through a signal conditioning circuit submodule, a band-limiting filtering circuit submodule, a sampling maintaining circuit submodule, and an analog-to-digital conversion circuit submodule. The nano relay based on integrated circuit calculates a characteristic quantity through a characteristic extraction circuit which performs a root-mean-square value calculation, an amplitude calculation and an ordinal quantity calculation, compares an extracted characteristic quantity with an artificially preset tuning parameter transmitted by a CPU through a numerical value comparison circuit submodule, and passes a comparison result to a logic determination circuit submodule. The logic determination circuit submodule outputs a switching signal to a peripheral circuit submodule according to a protection service logic and a numerical value comparison result driven output. That is, the nano relay based on integrated circuit is composed of the integrated circuit module built by the combinational logic circuit, its internal structure realizes a hardware implementation of a program logic, and it possesses autonomous calculation and determination capabilities, thereby improving a response speed of the relay.

Figure 3:
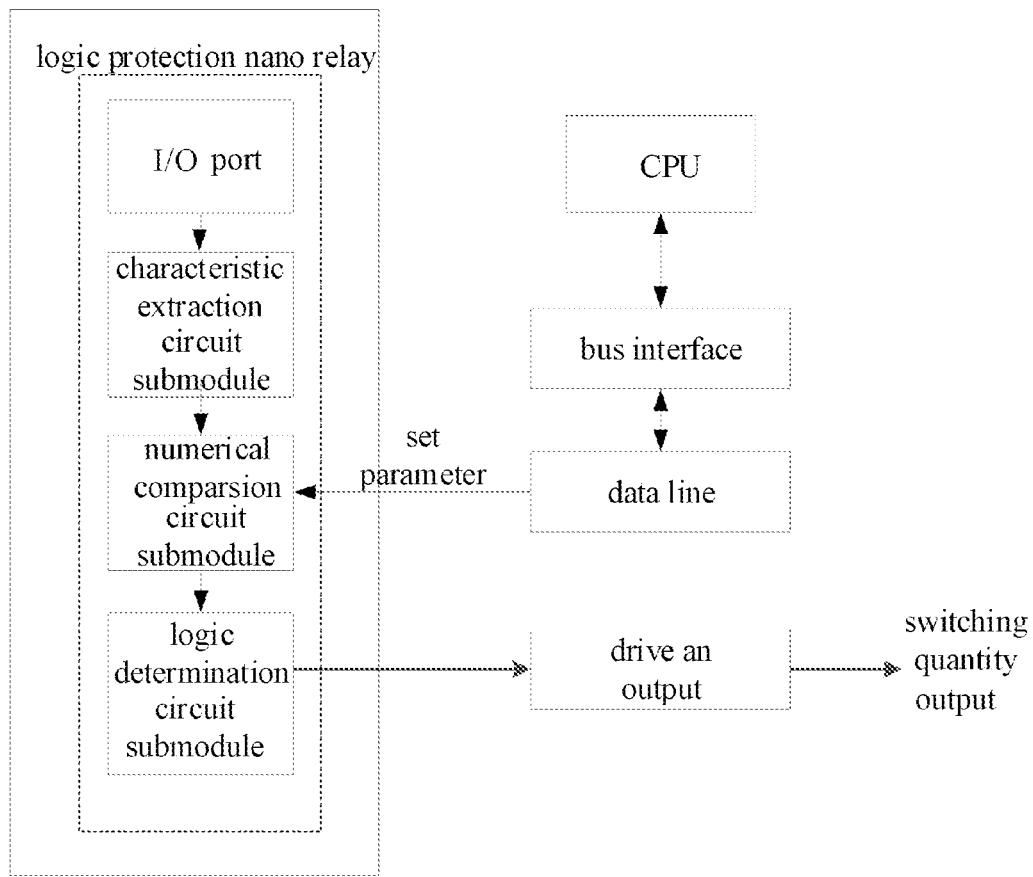
FIG. 3 is a structural block schematic diagram of a logic determination nano relay based on integrated circuits according to another embodiment.

According to another embodiment, as shown in FIG. 3, an integrated circuit-based nano relay is provided. An integrated circuit module in the present embodiment includes a combinational logic circuit module, and a peripheral signal processing circuit module connected to the combinational logic circuit module. An input power signal is a digital signal (the digital signal may be message data obtained from a network, or it may be sampling value message data obtained by a message decoding nano relay which is described in FIG. 8). The combinational logic circuit module further includes a characteristic extraction circuit submodule, a numerical value comparison circuit submodule and a logic determination circuit submodule. The characteristic extraction circuit submodule is configured to perform logic determination processing on a digital signal through invoking a power data processing algorithm, and to output a switching quantity signal. The peripheral signal processing circuit module is configured to perform data processing on power service data output by the combinational logic circuit, and to protect and control a power system.

That is, the characteristic extraction circuit submodule is configured to invoke a power data processing algorithm to extract a signal parameter of a digital signal for calculation, and obtains a characteristic quantity. The numerical value comparison circuit submodule is configured to compare the characteristic quantity with a preset tuning parameter sent by a CPU, and obtain a comparison result. The power data processing algorithm includes at least one of a half-cycle Fourier fundamental operation, a full-cycle Fourier fundamental operation, a least squares filtering algorithm, a Kalman filtering algorithm, or a DC component calculation algorithm. The characteristic quantity includes at least one of a fundamental wave component, a DC component or respective integer harmonic wave components. The logic determination circuit submodule is configured to perform a numerical value comparison result driven output of the comparison result according to a protection service logic, and to output a corresponding switching signal. Through the characteristic extraction circuit, a root-mean-square value calculation, an amplitude calculation and an ordinal quantity calculation and the likes are performed. The extracted characteristic quantity is compared by a numerical value comparison circuit with an artificially preset tuning parameter transmitted by the CPU. A comparison result is transmitted to the logic determination circuit. According to a protection service logic, the logic determination circuit outputs a switching quantity signal to the peripheral circuit based on a numerical value comparison result driven output. The nano relay, through an internally set program logic, possesses an autonomous computational and determining capability, thereby improving a response speed.

Optionally, according to an embodiment, the nano relay is an integrated circuit-based relay with an over-current protection logic. A digital signal is a discrete sampling value of current of each phase. The combinational logic circuit module includes a characteristic extraction circuit submodule, a numerical value circuit submodule and a logic determination circuit submodule. The characteristic extraction circuit submodule is configured to invoke a power data processing algorithm (for example, a half-cycle Fourier fundamental operation, a full-cycle Fourier fundamental operation) to extract a signal parameter of a discrete sampling value of current of each phase for calculation, and to obtain a characteristic quantity. The characteristic quantity is a module value of current of each phase. The numerical comparison circuit submodule is configured to compare the characteristic quantity with a preset setting current parameter sent by a CPU, and to obtain a comparison result.

In another word, current vector module values of respective phases are determined according to current vectors of respective phases. The vector module values are compared with current fixed values of respective stages and numerical value comparison results are obtained. A logic determination circuit submodule is configured to perform a numerical value comparison result driven output on the comparison result based on the protection service logic, and to output an over-current switching quantity signal (for example, a tripping operation). The protection service logic is an over-current protection logic of the power system, which is not to be repeated herein. Act of a current element is triggered by the outputted over-current switching quantity signal, and over-current protection is achieved. That is, circuit submodules of different logics are combined to obtain an integrated circuit, a protection logic of a current protection logic relay is achieved using a hardware circuit module, improving a response speed of the relay.

For the over-current protection (that is, a three-stage definite-time over-current protection), fixed values of respective stages of the three-stage definite-time over-current protection are independent from one another. Current of each phase is compared with a fixed current value of each stage. When a device detects that the current is greater than the fixed value, an over-current protection is launched, a timing element starts working, and an over-current element is triggered to operate, thereby achieving an over-current protection. For example, over-current stage I is served as an example and the operation condition of the over-current element is expressed as follows.

$$\max(Ia, Ib, Ic) > Idzl$$

Here, Idzl is a "fixed current value at over-current stage I-", Ia is a current of phase A, Ib is a current of phase B and Ic is a current of phase C. Over-current stage I with a direction element and a compound voltage locking element is served as example. When the over-current protection logic relay detects a current value of phase A with a positive direction is greater than the fixed current value of over-current stage I, an over-current protection is launched. A timing element t1 starts working, an over-current stage I operation is triggered such that an over-current protection is achieved. A protection logic for phase B and phase C is the same as the protection logic for phase A, thus is not to be repeated herein.

Figure 4:
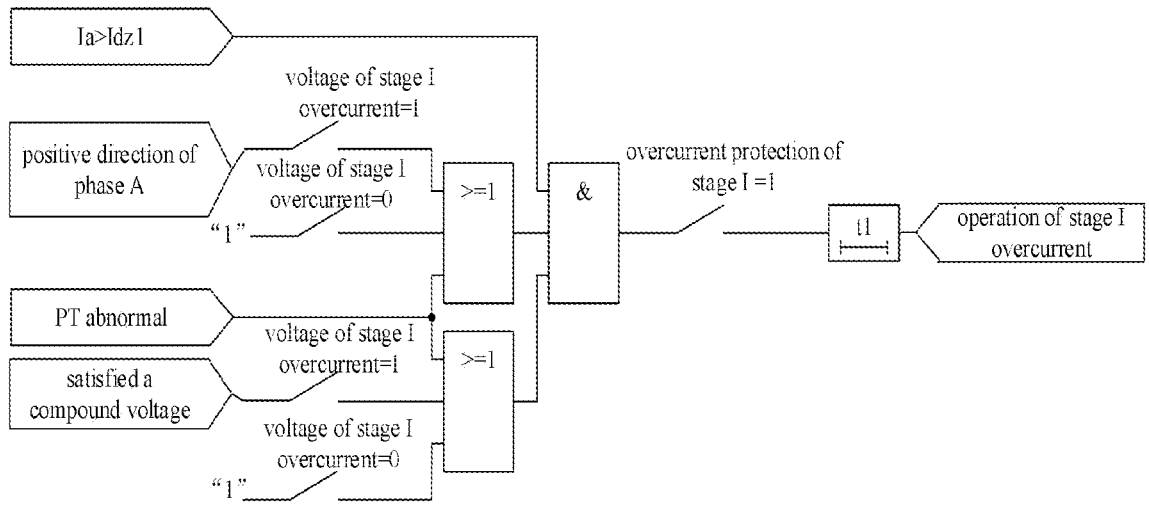
FIG. 4 a block schematic diagram of an application scenario of a current protection logic relay according to an embodiment.

As shown in FIG. 4, which is an application scenario of an over-current protection logic relay, that is, protection for over-current stage I with compound voltage and direction elements. When it is satisfied that: a current value of phase A with a positive direction is greater than a fixed current value of overcurrent stage I, it is in a phase A positive direction, a potential transformer (PT) is abnormal, and a compound voltage satisfies an abnormal condition, then the overcurrent protection is launched, a timing element t1 is launched, and an operation of overcurrent stage I is triggered, thereby achieving an overcurrent protection. When PT is abnormal, the overcurrent protection with the compound voltage locking element is automatically turned off from the compound voltage locking element. If the compound voltage locking element is not in operation, the overcurrent protection operation logic is not affected by the PT abnormality. When PT is abnormal, an overcurrent protection with a direction element is automatically turned off from the direction element. If the direction element is not in operation, the overcurrent protection operation logic is not affected by the PT abnormality.

Optionally, according to an embodiment, a nano relay is an integrated circuit-based relay with differential protection logic. A digital signal is a discrete sampling value of a current inflow, sampled by a relay protection device with differential protection logic under a normal condition. A combinational logic circuit includes a characteristic extraction circuit submodule, a numerical value comparison circuit submodule and a logic determination circuit submodule. The characteristic extraction circuit submodule is configured to invoke a power data processing algorithm (for example, a half-cycle Fourier fundamental operation, a full-cycle Fourier fundamental operation) to extract signal parameters of discrete sampling values for an inflow current and an outflow current of the protection device under a normal condition, perform calculation on the protection circuit is under a normal condition, and obtain a differential current value. The numerical value comparison circuit submodule is configured to compare the differential current value with a preset tuning parameter sent by a CPU, and to obtain a comparison result. The logic determination circuit submodule is configured to perform a numerical value comparison result driven output on the comparison result according to a protection service logic, and output a differential protection switching quantity signal. According to an outputted filtering switching quantity signal, a differential protection logic relay is triggered to operate, thereby achieving a differential protection. That is, the integrated circuit is constructed mainly through the combinational logic circuit, a protection logic of the differential protection logic relay is realized using a hardware circuit module, thereby improving a relay response speed.

A differential protection refers to that an operational element is launched when a vector difference between currents input to two ends of a current transformer (TA) reaches a preset operation value. A protection scope covers devices which input current into a CT and locate between two ends of the CT (which may be a line, an alternator, a motor, a transformer and other electrical devices). A differential protection is accomplished according to the principle "the sum of all currents entering a node equals zero".

A current differential protection is one type of relay protections. A positive phase sequence is that B is precedingly displaced by A by 120 degrees, and C is precedingly displaced by B by 120 degrees. A negative phase sequence (that is an inverse phase sequence) is that C is precedingly displaced by A by 120 degrees, and B is precedingly displaced by C by 120 degrees. An active direction reversal is merely adding 180 degrees between phases of the voltage and the current, which is a reversed phase power, not the inverse phase sequence.

A differential protection treats a protected electrical device as a node. In such a way, an inflow current and an outflow current of the protected device are equivalent when it is normal, and a differential current is equal to zero. When a failure occurs to the device, the inflow current and the outflow current of the protected device are different and the differential current is greater than zero. When the differential current is greater than a setting value of the differential protection device, an upper computer signals an alarm to protect an output operation, turns off circuit breakers at each side of the protected device such that the faulted device is cut off from a power source.

A differential protection works by abiding the Kirchhoff's Current Law. When a transformer is working properly or when faults occur externally, the transformer is treated as an ideal transformer. In such a way, the inflow current of the transformer and the outflow current of the transformer (reduced current) are the same, the differential relay does not operate. When faults occur to the transformer internally, two sides (or three sides) of the transformer provide short-circuited current to a faulty point; a differential protection senses that a sum of secondary currents is directly proportional to the current at the faulty point, the differential relay operates.

Figure 5:
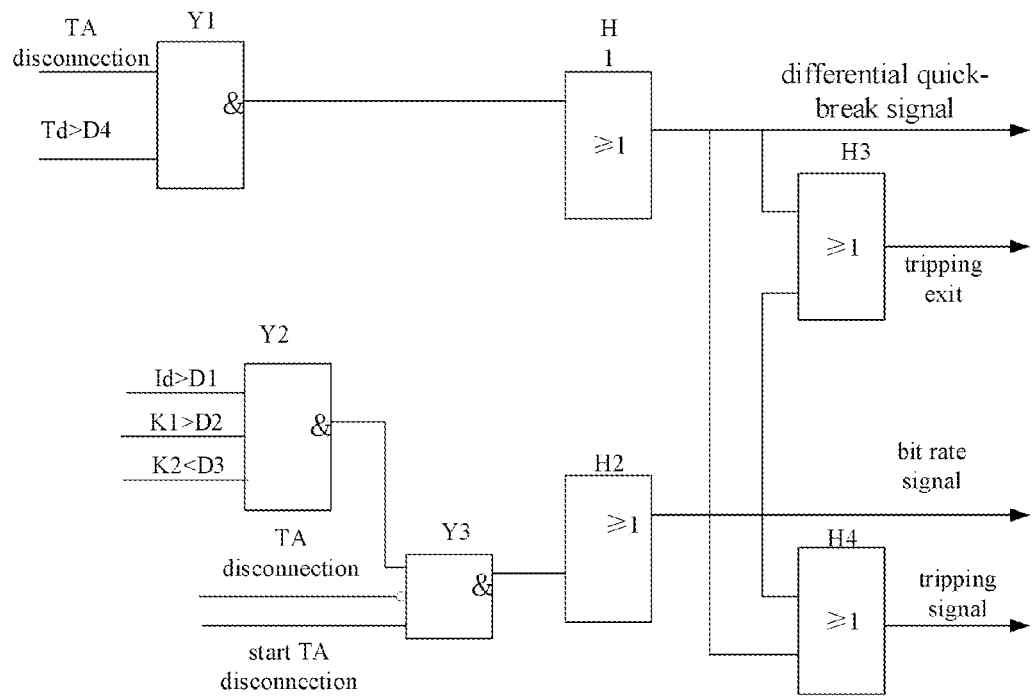
FIG. 5 is an over-current protection logic diagram of phase A according to an embodiment.

The protection service logic herein is a differential protection logic. A protection device is a transformer which is taken as an example for describing the differential protection logic. As shown in FIG. 5, where D1=Iact0, D2=KrelId/Ibrk are percentage braking coefficient setting values, D3 is a secondary harmonic wave breaking coefficient setting value. It may be seen that three criteria of a percentage differential protection operation are of an "AND" relationship which need to be simultaneously satisfied to initiate a tripping operation. Nevertheless, a differential quick-break protection is an auxiliary protection for the percentage differential protection, with a setting value of D4=Iact.s. When the percentage differential protection cannot rapidly reflect serious internal failures, the differential quick-break protection may rapidly output a tripping operation without any time delays. Therefore, a logic relationship between the two types of protections is "OR". The percentage differential protection may generate a great amount of differential current when TA incurs a secondary circuit disconnection such that an errored action occurs, in such a case, an operation is outputted merely after passing through a NOT gate of TA disconnection and locking and an AND gate of Y3. When TA is disconnected, the AND gate Y3 is locked, so no operation may be outputted.

The above-mentioned integrated circuit-based nano relay obtains a digital signal through an I/O port, inputs the obtained digital signal into the feature extraction circuit submodule to perform feature extraction and obtain a corresponding feature quantity. The extracted feature quantity is compared with a preset setting parameter, which is transmitted by the CPU, through a value comparison circuit submodule. A comparison result is transmitted to a logic determination circuit. The logic determination circuit, according to the service protection logic and a numerical value comparison result driven output, outputs a switching quantity signal to the peripheral circuit module. That is, the integrated circuit-based nano relay is composed of the integrated circuit module built by the combinational logic circuit, its internal structure realizes a hardware implementation of a program logic, and it possesses autonomous computational and determining capabilities, thereby improving a response speed of the relay.

Figure 6:
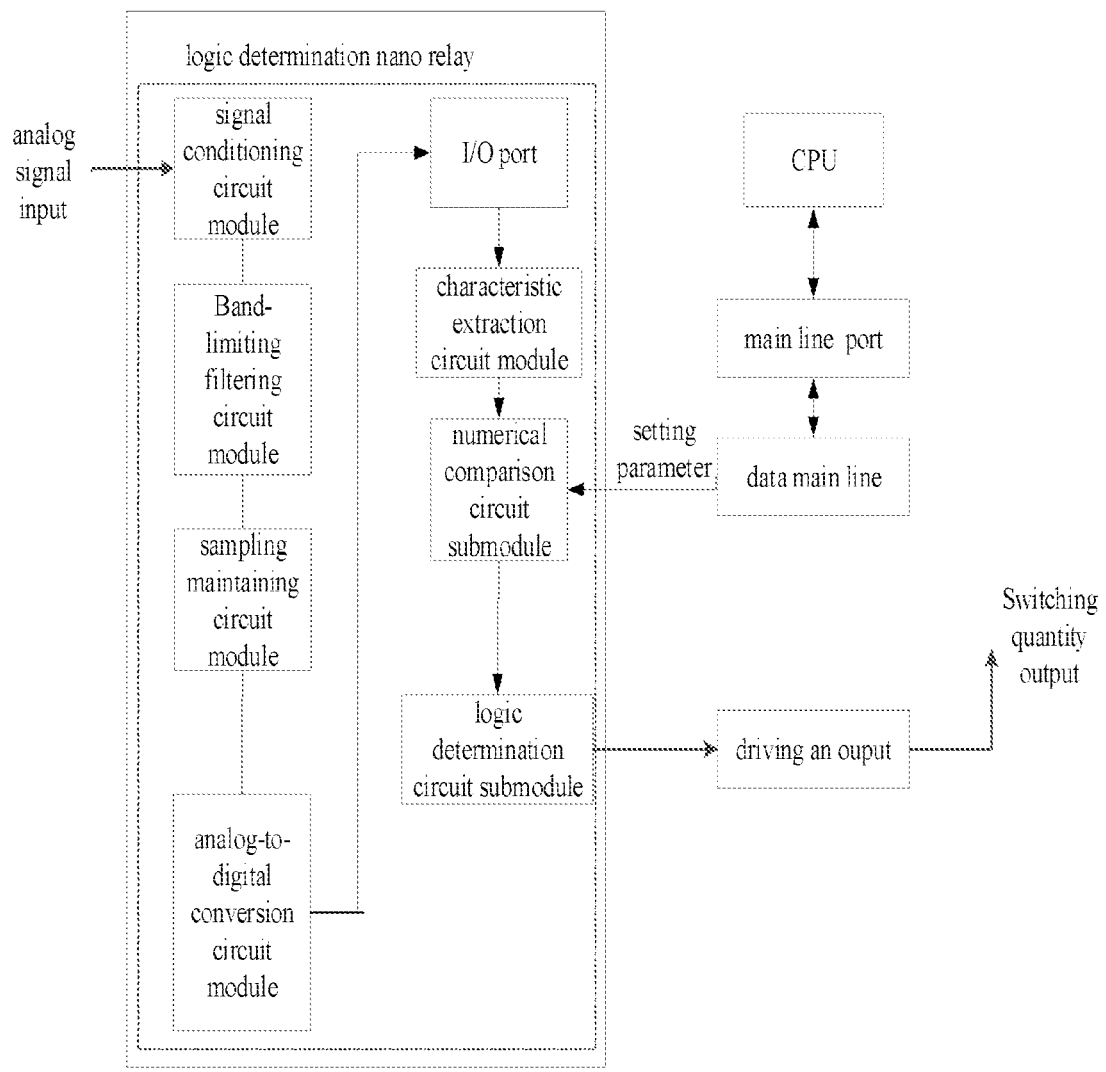
FIG. 6 is a structural block schematic diagram of a nano relay based on integrated circuits according to another embodiment.
Figure 7:
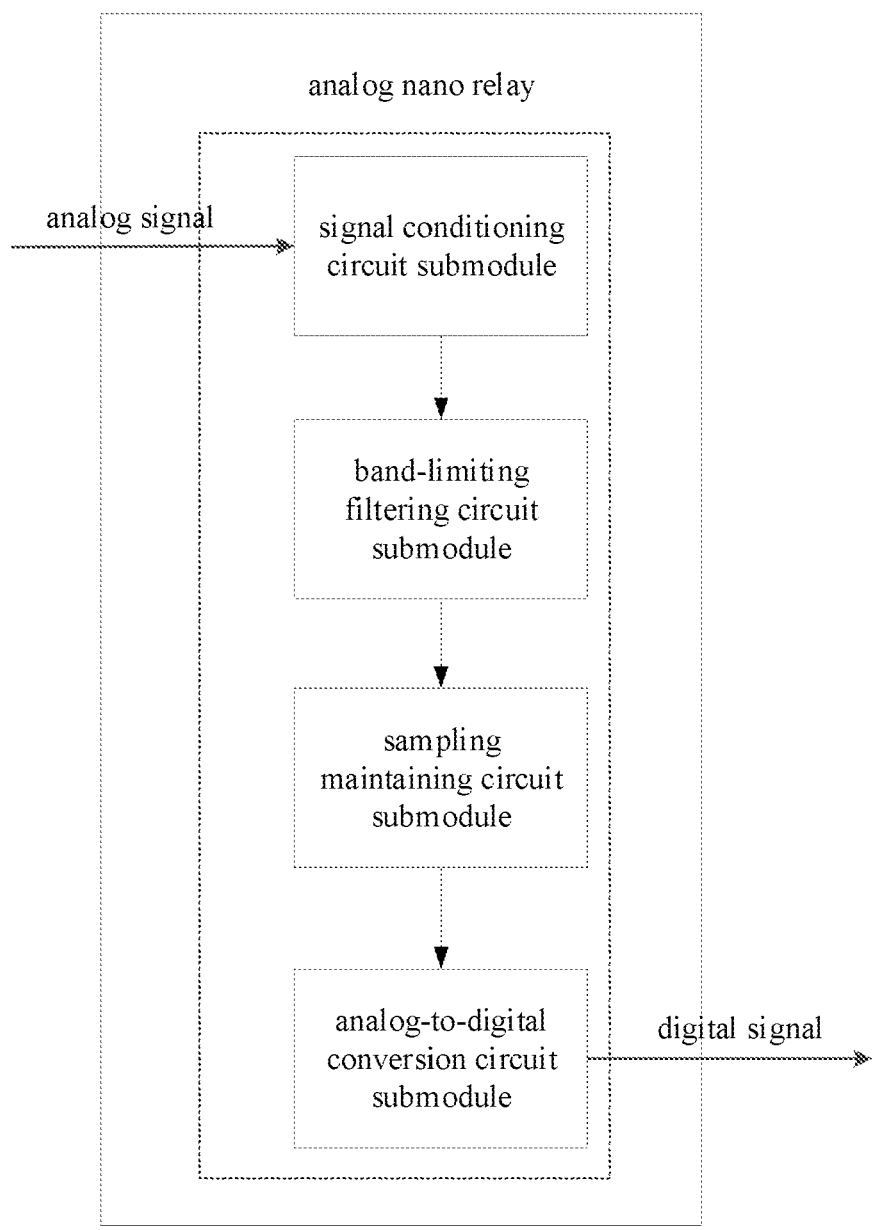
FIG. 7 is an analog processing nano relay based on integrated circuits according to one embodiment.

According to another embodiment, an integrated circuit-based nano relay is provided as shown in FIG. 6. An integrated circuit module in the present embodiment includes a combinational logic circuit module, and a peripheral signal processing circuit module connected to the combinational logic circuit module. An input power signal is an analog signal. In addition to including a characteristic extraction circuit submodule, a numerical value comparison circuit submodule and a logic determination circuit submodule, the combinational logic circuit module further includes a signal conditioning circuit submodule, a band-limiting filtering circuit submodule, a sampling maintaining circuit submodule and an analog-to-digital conversion circuit submodule. The signal conditioning circuit submodule is configured to amplify an analog signal, to protect a circuit of a front section, and to obtain an amplified signal. The band-limiting filtering circuit submodule is configured to perform filtering on the amplified signal and obtain a denoised analog signal. The sampling maintaining circuit submodule is configured to ensure a conversion accuracy of a digital signal obtained from converting the denoised analog signal by the analog-to-digital conversion circuit submodule. A nano relay for analog quantity processing as shown in FIG. 7 may be obtained by integrating the signal conditioning circuit submodule, the band-limiting filtering circuit submodule, the sampling maintaining circuit submodule and the analog-to-digital circuit submodule.

Specifically, in an integrated circuit-based nano relay with a determination logic, the integrated circuit module includes a combinational logic circuit module and a peripheral signal processing circuit module, which receives an externally inputted analog signal (for example, analog signal of collected current and voltage). Via a signal conditioning circuit submodule, a band-limiting filtering circuit submodule, a sampling maintaining circuit submodule, and an analog-to-digital conversion circuit submodule of the combinational logic circuit module, the analog signal is converted into a digital signal. A Fourier filtering algorithm of the power data algorithm is adopted, and the characteristic extraction circuit module is utilized to extract characteristics from the digital signal and perform a root-mean-square value calculation, an amplitude calculation and an ordinal quantity calculation, to obtain a characteristic quantity. That is, a filtering process is performed on sampled voltage and current data, and characteristic quantities of a fundamental wave, respective harmonic wave and a direct current component are directly calculated from non-sinusoidal signals. The extracted characteristic quantity is compared with a preset setting parameter through the numerical value comparison circuit submodule to obtain a comparison result, and the comparison result is sent to the logic determination circuit submodule. Determination is performed by circuit according to service protection logic, the power service data, i.e., switching quantity signal, is outputted, and the switching quantity signal is output to a corresponding peripheral signal processing circuit module. Data processing is performed on the switching quantity signal and the power system is protected and controlled.

In the above-mentioned integrated circuit-based nano relay, an externally inputted analog signal is inputted into an analog processing nano relay for signal conversion. That is, the signal is converted into a digital signal via a signal conditioning circuit submodule, a band-limiting filtering circuit submodule, a sampling maintaining circuit submodule, and an analog-to-digital conversion circuit submodule. Through the characteristic extraction circuit, a root-mean-square value calculation, an amplitude calculation and an ordinal quantity calculation are performed to obtain a characteristic quantity. The extracted characteristic quantity is compared by a numerical value comparison circuit with an artificially preset tuning parameter transmitted by the CPU. A comparison result is transmitted to the logic determination circuit. According to a protection service logic, the logic determination circuit outputs a switching quantity signal to the peripheral circuit based on a numerical value comparison result driven output. That is, the nano relay based on integrated circuit is composed of the integrated circuit module built by the combinational logic circuit, its internal structure realizes a hardware implementation of a program logic, and it possesses autonomous calculation and determination capabilities, thereby improving a response speed of the relay.

Figure 8:
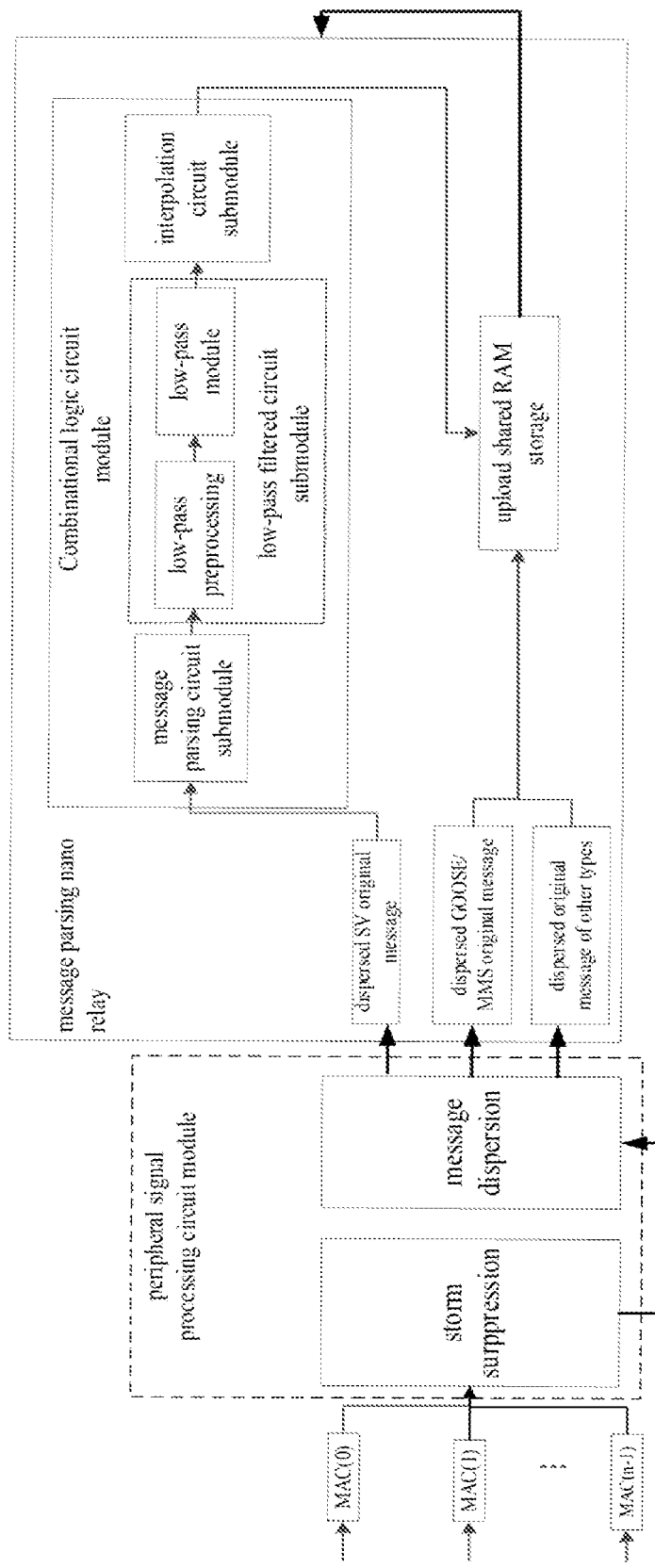
FIG. 8 is a structural block diagram of nano relay based on integrated circuits according to another embodiment.

According to another embodiment, a nano relay based on integrated circuit is provided as shown in FIG. 8. According to the embodiment, the nano relay is a message decoding nano relay. The nano relay includes an integrated circuit module which is built using a combinational logic circuit module and a peripheral signal processing circuit module. An input power signal is a power message data, and the peripheral signal processing circuit module is configured to perform storm suppression and message dispersion processings on the power message data to obtain original power message data to be processed, that is, a communication processing circuit submodule in the peripheral signal processing circuit module performs suppression and dispersion processings on the power message data to obtain original power message data to be dispersed. For example, after the communication processing circuit submodule performs storm suppression and message dispersion processings on MMS/GOOSE messages and other types of messages from received power message data, a processed result is uploaded to a shared RAM for storage, and SV message data is sent to the combinational logic circuit module. The combinational logic circuit module performs sampling differential processing on the power message data by invoking power data processing algorithm, and outputs sampling value message data.

The communication processing circuit submodules supports different types of communication functions, including an MMS/GOOSE message communication type, an HSR ring network communication type, an optical fiber longitudinal differential communication type and the likes. The MMS/GOOSE message communication type is responsible for transceiving work of MMS messages or GOOSE messages, and possesses working modes including dispersive receiving, broadcast suppression, multicast suppression, unicast receiving and the likes for the MMS messages, and functions including GOOSE storm suppression, data suppression, GOOSE subscription receiving and the likes for GOOSE messages. The communication processing circuit submodule possesses an ethernet message receiving module, which is configured to forward, after GOOSE messages, customized messages and the likes received from an ethernet port are processed through necessary message decoding and data suppression, the GOOSE messages, customized messages and the likes to a CPU for subsequent processing. The communication processing circuit submodule further possesses an ethernet message sending module which is configured to forward GOOSE, GMRP, customized messages which are processed by the CPU to the ethernet port.

The HSR ring network communication type implements message communication in a ring network topology structure specified in IEC62439-3-2012 protocol. The HSR ring network communication type is composed of an HSR ring network management interface, an HSR message receiving module and an HSR message sending module. The HSR ring network management interface is configured to manage an HSR ring network communication module and implement related functions including inner-ring node message communication, network time alignment, SV message delay testability and the likes. The HSR message receiving module is configured to receive ring network internal messages sent via an HSR ring network, perform filtering and sampling value synchronization on the messages according to configuration. The HSR message sending module is configured to perform interpolation and synchronization processing on ADC sampling values and ethernet SV received sampling values and then organize processed sampling values into an HSR internal sampling value message, and send the HSR internal sampling value message to other devices via the ring network.

The optical fiber longitudinal differential communication type provides a physical link path for optical fiber longitudinal differential communication, which supports two communication modes, i.e., a primary mode and a subordinate mode, supports 2048 kbit/s, 4096 kbit/s and other baud rates. The optical fiber longitudinal differential communication type internally configures an optical fiber longitudinal differential communication message transceiving control module, which is used to control receiving and sending of optical fiber longitudinal differential communication messages. While transceiving messages, the optical fiber longitudinal differential communication message transceiving control module possesses an accurate time tagging function, which may realize synchronization of optical fiber longitudinal differential communications at a present side and an opposite side, the time tag is synchronized with a nanosecond counter.

Figure 9:
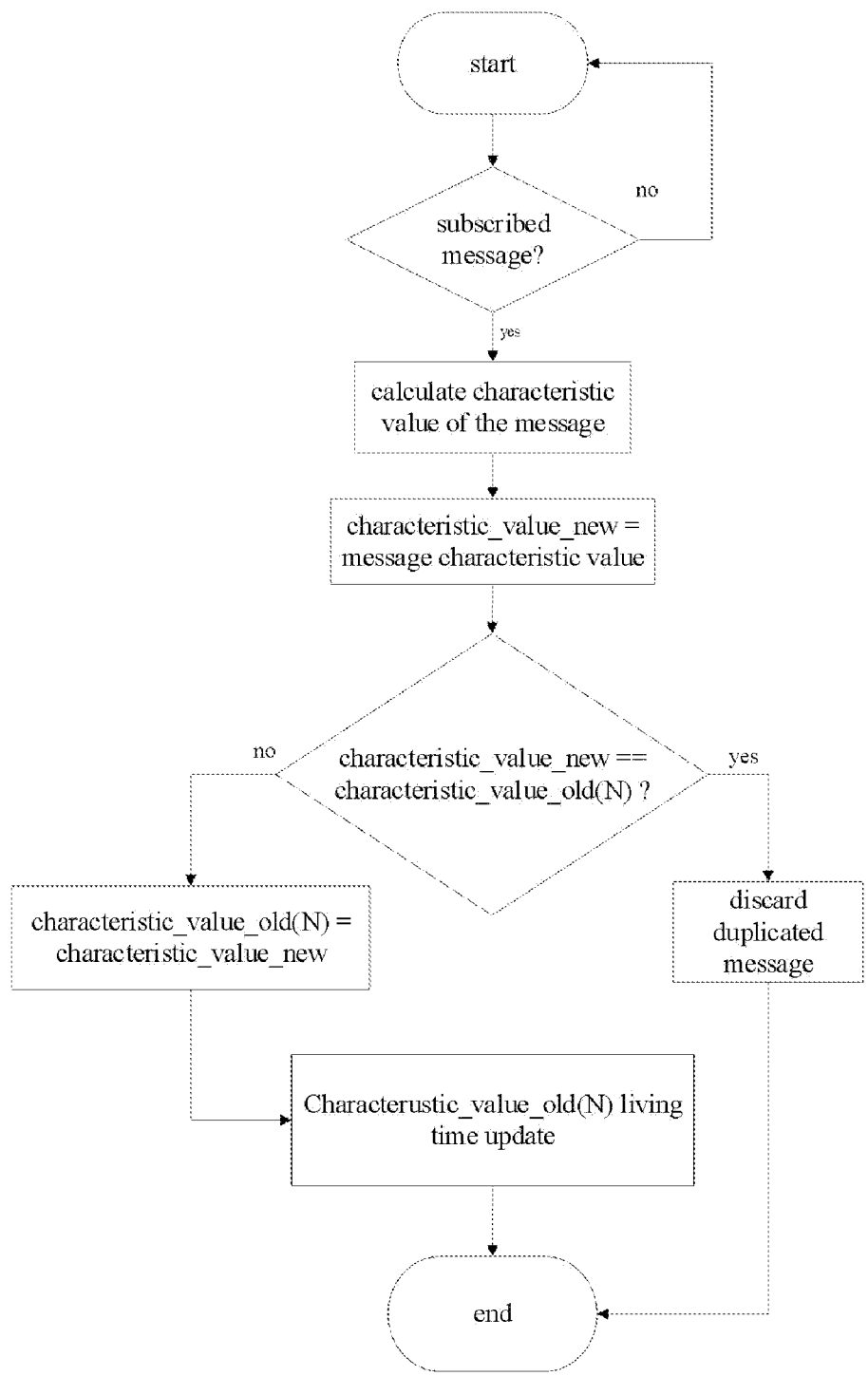
FIG. 9 is a schematic diagram of a message filtering process according to one embodiment.

The combinational logic circuit module includes a message decoding circuit submodule, a low-pass filtering circuit submodule, and an interpolation circuit submodule for sampling values. The message decoding circuit submodule is configured to recognize, remove duplications and parse power message data, i.e., sampled value (SV) message, which is undergone storm suppression and message dispersion, such that target power message data, i.e., valid message data may be obtained. That is, recognizing received SV messages, and this stage is called SV message subscription. During this stage, whether the an SV message is received is determined according to MAC address of the message and a configured SV receiving mode. After the recognition is completed, repeated messages in the subscribed SV messages are discarded through a repeated message filtering algorithm. Specific information of the SV messages include a MAC address, a message APPID, an SV message receiving port number which may be used to calculate a message characteristic value to obtain a new characteristic value. The new characteristic value (characteristic_value_new) and a pre-stored characteristic value (characteristic_value_old) are compared to determine whether they are equivalent. Inequivalent messages are discarded and messages with equivalent characteristic values are saved, living time of the characteristic_value_old is updated as shown in FIG. 9.

SV communication message frame format of the message is shown in Table 1, the content thereof adopts a coding rule of "T-L-V", that is, "type-length-value" and main characteristics of sending of the message include the following.

TABLE 1

| SV communication message frame format | | | |
|---|---|---|---|
| type | length | content | value |
| HeaderMAC | 6 Byte | MAC target address | 0x010CCD040000~0x010CCD0401FF |
| | 6 Byte | MAC source address | |
| Priority tagged | 2 Byte | TPID | 0x8100 |
| | 2 Byte | TCI | 0x8000 |

TABLE 1-continued

| SV communication message frame format | | | |
|---|---|---|---|
| type | length | content | value |
| EtherType | 2 Byte | Ethertype | 0x88BA |
| | 2 Byte | APPID | 0x4000~0x7FFF |
| Header | 2 Byte | Length | |
| | 4 Byte | Reserved field | |
| APDU | <1439 Byte | ASDU | |
| optional padding bytes MAC inspection | 4 Byte | CRC | |

(1) sending time interval: 80 points in every communication cycle, that is, one frame is sent every 250 µs with an accuracy of ±10 µs.

(2) a manner of sending: multicast sending and unicast sending are supported. To ensure the reliability of message transmission, an A/B network manner is adopted to send two pieces of data, the receiving end obtains one piece of data based on a receiving order.

(3) a sending message format: the SV message may be divided into a message header, an ADPU unit, and a cyclic redundancy check (CRC) field as shown in Table 1, where partial information of the message header and CRC is mainly used for determination and checking at the receiving end. The APDU unit usually includes one ASDU unit which includes a sampling value counter, a sampling value synchronization identifier, and an actual sampling value channel number.

(4) sending message channel sampling value: sampling value data is stored in a ASDU unit which supports at most 49 sampling channels and supports selection of the channel and configuring channel parameters for data scaling. In addition, information further contained in the ASDU unit mainly includes: message counting information, which is used to determine whether there is lost data point at the receiving side and to synchronize the SV counter; a synchronization identification bit "SmpSynch" of the SV message, which should be TRUE when it is synchronized, and should be FALSE when it is not synchronized; and SV message transmission delay information, which is used as a basis for performing interpolation and synchronization at the receiving end.

Optionally, according to an embodiment, repeated messages in subscribed SV messages are discarded and information about serial number of a receiving port is added into the characteristic value, such that accuracy of message filtering and filtering efficiency are improved.

The low-pass filtering circuit submodule is configured to perform low-pass filtering processing on the target power message data to obtain denoised target power message data.

The interpolation circuit submodule is configured to invoke a sampling value algorithm to perform an interpolation and synchronization processing on the target power message data to obtain sampling value message data of target sampling points, and send the sampling value message data to a corresponding node.

Figure 10:
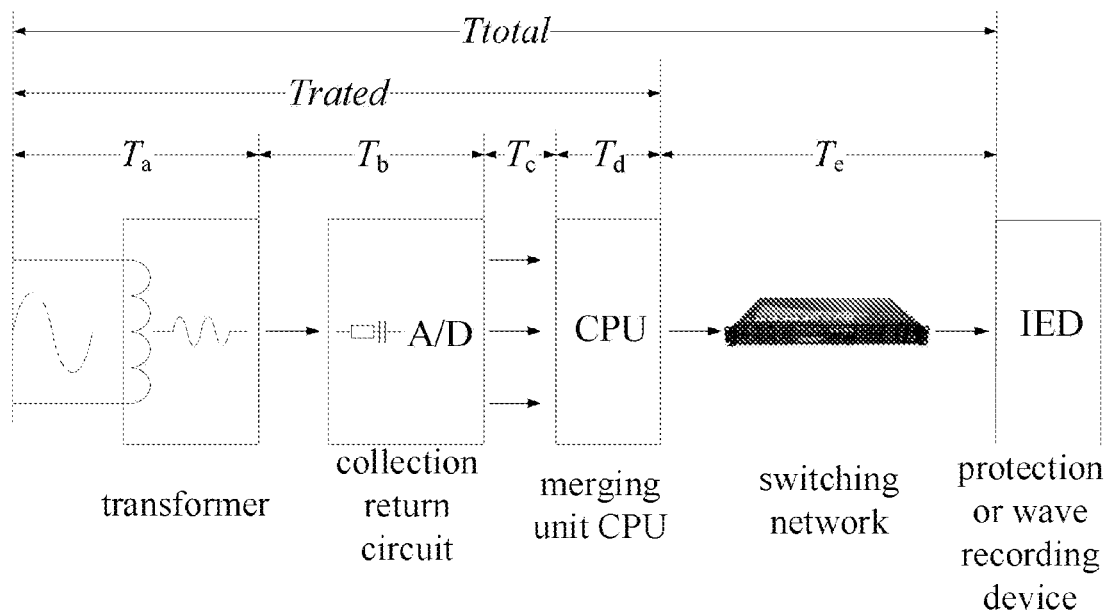
FIG. 10 is a schematic diagram of message transmission delay according to an embodiment.

Since rated delays of message uploading on merging units from respective manufacturers are different, network jitter may cause adverse effect, and inconsistent SV data channels under different sampling modes when sampling modes are used in a hybrid manner may also cause adverse effect, it results in comparatively large difficulty for sampling value synchronization. As shown in FIG. 10, the sampling value message data is transmitted to a collection circuit via a transformer, and then input to a CPU in a merging unit. After the merging unit forms the data into an SV message as specified in IEC61850 protocol, the SV message is transmitted, via a network, to a protection device or to other intelligent electronic devices (IEDs). Point-to-point transmission is directly used by the merging unit for sending data to IED without using a switched network. A direct analog collection manner is to place the collection circuit at the IED side. $T_a$ is a time delay of the transformer; $T_b$ is a time delay caused by an RC filter; $T_c$ is a transmission delay from the collection circuit to the CPU of the merging unit; $T_d$ is a processing time delay of the merging unit; $T_e$ is a network transmission time delay from the merging unit to the protection device; $T_{rated}$ is a rated time delay of the merging unit; $T_{total}$ is a total transmission time delay of the sampling value.

$T_{rated}$ may be a fixed value, but the rated time delays for different manufacturers are marked differently and a rated time delay specified by technical standard in the power industry is not longer than 2 ms. $T_e$, the network transmission delay, is a jitter value. It is specified by the technical standard in the power industry that a fixed time delay of an exchanger for transmitting data with various frame lengths should be smaller than 10 μs. Data transmission modems between any two IDEs may not exceed 4 exchangers. A key point to accomplish sampling value synchronization is to cache, based on a former-waiting-for-later (that is, quick-waiting-for-slow) principle, a certain number of sampling value messages to calculate and obtain sampling point data at a same sampling moment. That is, after the message decoding nano relay performs parsing on the power message data, a timestamp of the message may be obtained.

In other words, an interpolation and synchronization processing refers to time interpolation and synchronization, that is, according to a relationship between a message arriving moment and an interpolation pulse trigger moment, a sampling value at an interpolation triggering moment is calculated through a first-order Lagrange interpolation algorithm (first-order linear interpolation) to realize synchronization. A deviation time of the SV message uploaded by the merging unit must be controlled within a range of +/−10 μs as required by technical standard in the power industry, to ensure an accuracy requirement of interpolation.

Since different numbers of sampling points need to be outputted according to different applications after interpolation and synchronization of the data, for example, a bus differential and line protection needs 24 points/cycle sampling rate, measurement control requires 48 points/cycle sampling rate, and SV sending requires 80 points/cycle sampling rate. For ease of processing and reducing utilization of FPGA chip resources, it is uniformly interpolated as 240 points/cycle sampling rate, then points are extracted based on configuration to output sampling value messages of corresponding numbers of points to different applications.

Figure 11:
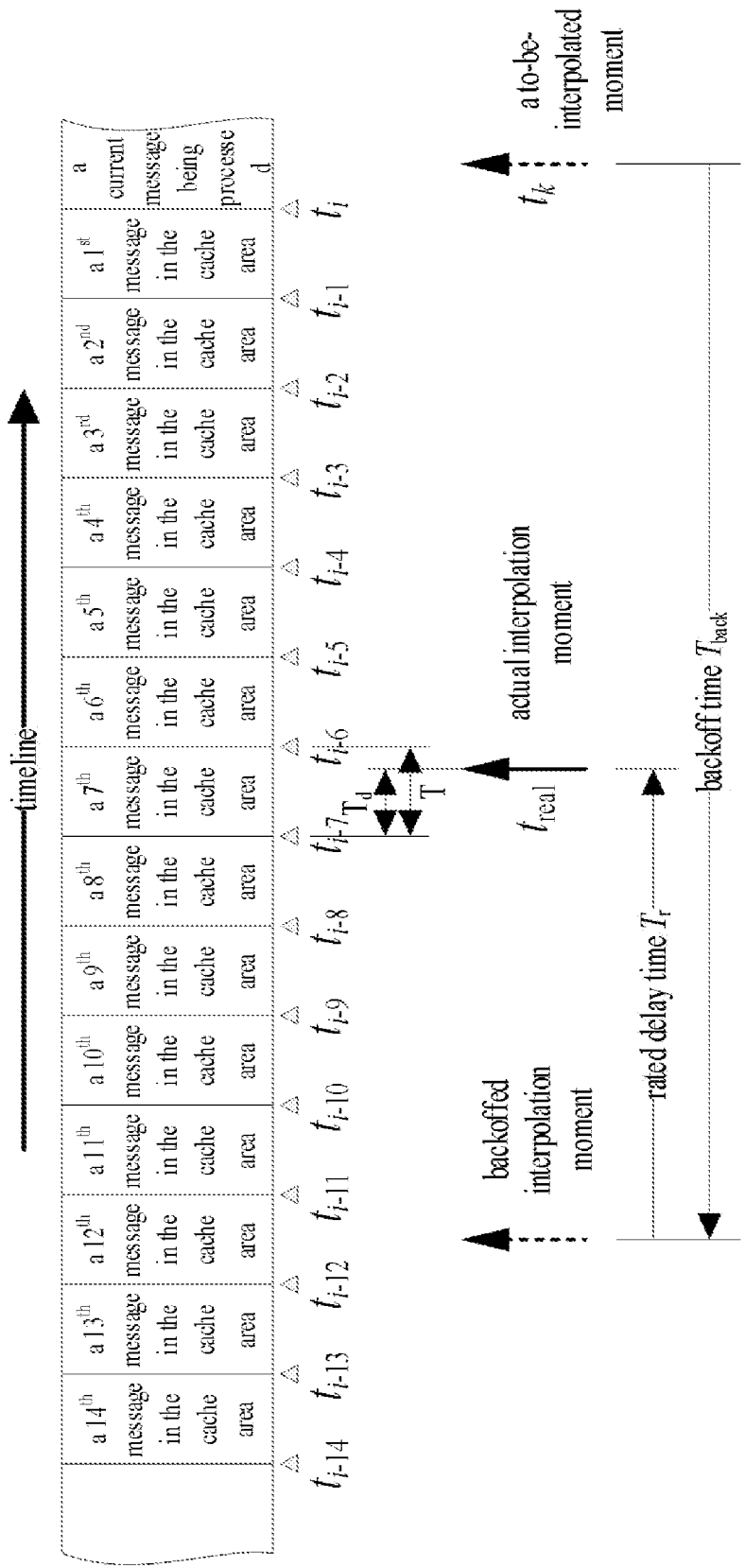
FIG. 11 is a schematic diagram of message temporal interpolation and synchronization according to an embodiment.

As shown in FIG. 11, according to an embodiment, a temporal interpolation and synchronization program of the interpolation and synchronization processing adopts 32 sampling value messages being cached, respective arrival times (ti) of messages are recorded. Then based on the interpolation moment (tk), a corresponding interpolated interval is sought after. A first-order Lagrange interpolation algorithm (that is, first-order linear interpolation) is adopted to calculate a sampling value at interpolation moment. $t_i, \ldots, t_{i-14}$ respectively represent moment values of messages being received, a moment to be interpolated is an interpolation pulse trigger moment, a back-off time is peculiarly set to ensure that the linear interpolation is an intra region interpolation (with high accuracy), and a rated time delay is for uploading messages by the merging unit.

A formula for calculating the sampling value corresponding to an actual interpolation moment is as follows.

$$Y_{real} = Y_{i-7} + \frac{(Y_{i-6} - Y_{i-7})(t_{real} - t_{i-7})}{t_{i-6} - t_{i-7}}$$
$$= Y_{i-7} + \frac{(Y_{i-6} - Y_{i-7})T_d}{T}$$

In the formula, $Y_{real}$ is a sampling value at an actual interpolation moment; $Y_{i-7}$ is a sampling value of a former message in an interpolation interval; $Y_{i-6}$ is a sampling value of a latter message in the interpolation interval; $T_d$ is a time difference from the interpolation moment to a receiving moment of the former message; T is a time difference between the former message and the latter message. Since the value of T is relatively stable, it may be 250 μs.

To reduce data processing time delay and improve protection rapidity, determination of the backoff time has become a key factor. If the backoff time is too long, it affects protection rapidity; if the backoff time is too short, it may cause a rated delay out-of-bound phase modulation interpolation data error. Therefore, the program, based on detected uploading rated time delays of respective merging units, filters out a maximum rated time delay value, then fitting is performed with a 24-point sampling interval to determine a backoff time equivalent to how many 24-point sampling intervals. This realizes a real-time adjustment of the backoff time, and the value is uploaded to the CPU as an important parameter of the optical fiber differential protection.

For example, when 3 merging units are connected in the system, rated delays of which are 1.7 ms, 1.85 ms, and 1.4 ms respectively. A maximum rated time delay being selected is 1.85 ms, and a total backoff time is 2.35 ms which is obtained by adding a fixed backoff time value of 500 μs to 1.85 ms. In application scenarios such as bus differential protection, transformer protection, wave recording and the likes, the backoff time is selected to be 2.35 ms. However, in an application scenario of line protection (optical fiber differential protection), only an adjustment in terms of integer points based on the 24-point sampling interval may be performed for synchronizing with an opposite side. Therefore, a backoff time should be set to be an integer number of the 24-point sampling interval. A minimum integer of the 24-point sampling interval, which is greater than 2.35 ms, is 3, thus the backoff time is selected to be 2.5 ms (3×0.833≈2.5 ms). At present, the largest backoff time in the algorithm is set to be 5 times of the 24-point sampling interval, i.e. 4.165 ms (5×0.833=4.165 ms).

An application scenario of nano relay based on integrated circuits is as follows. Through the peripheral signal processing circuit module, a storm suppression and message dispersion are performed on received circuit message to obtain power message data. Through the message decoding circuit submodule in the message decoding nano relay, the suppressed and dispersed power message data is recognized, duplication removed and analyzed to obtain target power message data. Through the low-pass filtering circuit submodule, the target power message data is low-pass filtered to obtain target power message data after noise reduction. Through the interpolation circuit submodule, a sampling value algorithm is invoked to perform interpolation and synchronization process on target power message data to obtain sampling value message data of target sampling points.

The obtained sampling value data is sent to the logic determination nano relay via an I/O port; a switching quantity signal is outputted through the characteristic extraction circuit submodule, numerical value circuit submodule and logic determination circuit submodule for logical processing, that is, through invoking a power data processing algorithm to perform logical processing on the digital signals. The peripheral signal processing circuit module is configured to perform data processing on power service data outputted by the combinational logic circuit, and to perform a protection control on the power system.

In the above-mentioned integrated circuit-based message decoding nano relay, through a peripheral signal processing circuit module, the received circuit message data is storm suppressed and dispersed, and the SV message data is recognized and duplication removed to obtain target power message data. The low-pass filtering circuit submodule is configured to perform low-pass filtering processing on the target power message data to obtain a target power message data after noise reduction. The interpolation circuit submodule is configured to invoke a sampling value algorithm to perform interpolation and synchronization processing on target power message data to obtain sampling value message data of target sampling points, and upload it to a shared RAM storage for saving. That is, the nano relay based on integrated circuit is composed of the integrated circuit module built by the combinational logic circuit, its internal structure realizes a hardware implementation of a program logic, and it possesses autonomous calculation and determination capabilities, thereby improving a response speed of the relay.

It is to be understood that, although steps in the flow charts among FIG. 1-FIG. 11 are displayed in sequence based on indication of arrows, these steps are not necessarily executed sequentially based on the sequence indicated by the arrows. Unless otherwise explicitly specified herein, sequence to execute the steps is not strictly limited, and the steps may be executed in other sequences. In addition, at least some steps in FIG. 1-FIG. 11 may include multiple steps or multiple stages, and these steps or stages are not necessarily executed at the same moment, but may be executed at different moments. These steps or stages are not necessarily executed in sequence, but may be executed in turn or alternately with another step or at least a part of steps or stages of another step.

Those with ordinary skill in the art may understand that all or some of the above-mentioned embodiments may be implemented by a computer program instructing relevant hardware. The computer program may be stored in a nonvolatile computer readable storage medium. When the computer program is executed, the execution may include embodiments of the above-mentioned methods. Any references to a memory, a database, or another medium used in the various embodiments provided in the disclosure may include at least one of a non-volatile and a volatile memory. The nonvolatile Memory may include Read-Only Memory (ROM), magnetic tape, floppy disk, flash memory, optical memory, high-density embedded nonvolatile memory, Resistive Random Access Memory (ReRAM), Magnetic Random Access Memory (MRAM), Ferroelectric Random Access Memory (FRAM), Phase Change Memory (PCM), graphene memory, and the like. Volatile memory may include Random Access Memory (RAM), external cache memory, and the like. By way of illustration and not limitation, RAM may take many forms, such as Static Random Access Memory (SRAM) or Dynamic Random Access Memory (DRAM), among others.

Technical features of the above-mentioned embodiments may be freely combined. To be brief in description, not all possible combinations of the technical features in the above-mentioned embodiments are described. However, the combinations of these technical features should be considered to fall within the scope of this specification as long as these combinations cause no conflicts.

The above-mentioned embodiments only represent several embodiments of this disclosure, and their descriptions are specific and detailed, but should not be understood as limiting the scope of this disclosure. It should be noted that, several modifications and improvements can be made by those of ordinary skill in the art without departing from the concept of this disclosure, which belong to the protection scope of this disclosure. Therefore, it is intended that the protection scope of this disclosure shall confirm to the appended claims.

What is claimed is:
1. A nano relay based on integrated circuit, built with an integrated circuit module;
   wherein the integrated circuit module comprises a combinational logic circuit module, the combinational logic circuit module comprises circuit submodules with different hardware algorithm logics, and the combinational logic circuit module is used to perform signal processing on an input power signal by invoking a power data processing algorithm, and to output power service data, the power data processing algorithm being integrated in the circuit submodules of the combinational logic circuit; the power data processing algorithm comprises at least one of: a half-cycle Fourier operation on a fundamental wave, a full-cycle Fourier operation on a fundamental wave, a least squares filtering algorithm, a Kalman filtering algorithm, or a DC component calculation algorithm;
   wherein the combinational logic circuit module comprises at least one circuit submodule of: a characteristic extraction circuit submodule, a numerical value comparison circuit submodule, a logic determination circuit submodule, a signal conditioning circuit submodule, a band-limiting filtering circuit submodule, a sampling maintaining circuit submodule, an analog-to-digital conversion circuit submodule, a message decoding circuit submodule, a low-pass filtering circuit submodule, or an interpolation circuit submodule;
   wherein different circuit submodules are integrated to obtain nano relays with different functions; the nano relay comprises any of: a logic determination nano relay, a sampling value processing type nano relay, an electrical parameter calculation type nano relay, a time management type nano relay, a communication management type nano relay, an overcurrent protection logic relay, a differential protection logic relay, an analog processing nano relay and a message decoding nano relay; the combinational logic circuit is built according to a protection algorithm logic of a power system relay protection service;
   in case that the power signal is an analog signal, the combinational logic circuit module comprises the signal conditioning circuit submodule, the band-limiting filtering circuit submodule, the sampling maintaining circuit submodule, the analog-to-digital conversion circuit submodule, the characteristic extraction circuit submodule, the numerical value comparison submodule and the logic determination circuit submodule;

in case that the power signal is a digital signal, the combinational logic circuit module comprises the characteristic extraction circuit submodule, the numerical comparison circuit submodule and the logic determination circuit submodule;

in case that the power signal is power message data, the combinational logic circuit module comprises the message decoding circuit submodule, the low-pass filtering circuit submodule and the interpolation circuit submodule.

2. The nano relay of claim 1, wherein the integrated circuit module further comprises a peripheral signal processing circuit module, configured to: perform data processing on power service data output by the combinational logic circuit, and protect and control a power system.

3. The nano relay of claim 1, wherein the power signal is a digital signal, the combinational logic circuit module is configured to perform logic determination processing on the digital logic through invoking the power data processing algorithm, and to output a switching quantity signal;

wherein the characteristic extraction circuit submodule is configured to: invoke the power data processing algorithm to extract a signal parameter from the digital signal, perform calculation on the signal parameter, and obtain a characteristic quantity;

the numerical value comparison circuit submodule is configured to: compare the characteristic quantity with a preset setting parameter sent by a CPU, and obtain a comparison result; and the logic determination circuit submodule is configured to: perform a numerical value comparison result driven output of the comparison result according to a protection service logic, and output a corresponding switching quantity signal.

4. The nano relay of claim 3, wherein the characteristic quantity comprises at least one of: a fundamental wave component, a DC component, or respective integer harmonic wave components.

5. The nano relay of claim 3, wherein the nano relay is an integrated circuit-based relay with an over-current protection logic, and the digital signal is a discrete sampling value of current of each phase;

wherein the characteristic extraction circuit submodule is configured to: invoke the power data processing algorithm to extract a signal parameter of the discrete sampling value of current of each phase for calculation, and obtain a characteristic quantity; the characteristic quantity is a module value of current of each phase;

the numerical value comparison circuit submodule is configured to: compare the characteristic quantity with a preset setting current parameter sent by the CPU, and obtain a comparison result;

the logic determination circuit submodule is configured to: perform a numerical value comparison result driven output of the comparison result based on the protection service logic, and output an over-current protection switching quantity signal.

6. The nano relay of claim 3, wherein the nano relay is an integrated circuit-based relay with a differential protection logic, the digital signal is a discrete sampling value of an inflow current and an outflow current of a differential protection logic relay protection device in a normal condition;

wherein the characteristic extraction circuit submodule is configured to invoke the power data processing algorithm to extract vectors of the inflow current and the outflow current, perform calculation on the vectors, and obtain a differential current value;

the numerical value circuit submodule is configured to: compare the differential current value with the preset setting parameter sent by the CPU, and obtain a comparison result;

the logic determination circuit submodule is configured to: perform a numerical value comparison result driven output of the comparison result, and output a differential protection switching quantity signal.

7. The nano relay of claim 1, wherein the power signal is an analog signal, and the combinational logic circuit module is configured to perform logic determination processing on the analog signal by invoking the power data service algorithm, and to output a switching quantity signal;

wherein the signal conditioning circuit submodule is configured to amplify the analog signal, to protect a circuit of a front section, and to obtain an amplified signal;

the band-limiting filtering circuit submodule is configured to perform filtering on the amplified signal, and to obtain a denoised analog signal;

the sampling maintaining circuit submodule is configured to ensure a conversion accuracy of a digital signal obtained from converting the denoised analog signal by the analog-to-digital conversion circuit submodule;

the characteristic extraction circuit submodule is configured to invoke the power data processing algorithm to extract a signal parameter from the digital signal obtained from converting the denoised analog signal by the analog-to-digital conversion circuit submodule, to perform calculation on the signal parameter, and to obtain a characteristic quantity;

the numerical value comparison circuit submodule is configured to compare the characteristic quantity with a preset setting parameter sent by a CPU, and to obtain a comparison result; and the logic determination circuit submodule is configured to perform a numerical value comparison result driven output of the comparison result according to a protection service logic, and to output a corresponding switching quantity signal.

8. The nano relay of claim 2, wherein the inputted power signal is power message data, the peripheral signal processing circuit module is further configured to perform a storm suppression and a message dispersion on the power message data to obtain original power message data to be processed.

9. The nano relay of claim 8, wherein the combinational logic circuit module is configured to invoke the power data processing algorithm to perform a sampling differential processing on the original power message data and output sampling value message data.

10. The nano relay of claim 9, wherein the message decoding circuit submodule is configured to recognize, remove duplications from, and parse suppressed and dispersed power message data to obtain target power message data;

the low-pass filtering circuit submodule is configured to perform low-pass filtering on the target message power data to obtain denoised target power message data; and the interpolation circuit submodule is configured to invoke a sampling value algorithm to perform interpolation and synchronization on the target power message data to obtain sampling value message data of target sampling points.

* * * * *